June 1, 1937.   L. D. BRIDGE   2,081,899
AUTOMOBILE RUNNING BOARD
Filed Oct. 21, 1936

Inventor
L. D. Bridge
By L. B. James
Attorney

Patented June 1, 1937

2,081,899

UNITED STATES PATENT OFFICE 2,081,899

AUTOMOBILE RUNNING BOARD

Lawrence D. Bridge, Blairsville, Pa.

Application October 21, 1936, Serial No. 106,871

3 Claims. (Cl. 240—8.26)

This invention relates to automobile bodies and more particularly to the running boards thereof.

The primary object of this invention resides in the provision of an illuminated running board for automobiles adapted to cast beams of light on the road beside the automobile.

Another object of this invention resides in the provision of an illuminated running board for automobiles of such construction that it can be substituted for the conventional automobile running board without altering the construction of the automobile.

A further object of this invention resides in the provision of an illuminated running board for automobiles which is not only adapted to cast beams of light to the roadside of automobiles but which can be reversed to cast beams of light beneath the automobile when greasing or working under the same.

With these and other objects in view this invention resides in certain novel features of construction to be hereinafter fully set forth in the specification, illustrated in the accompanying drawing and pointed out in the appended claims and, while this disclosure depicts my present conception of the invention, the right is reserved to resort to such changes in construction and arrangement of elements as come within the scope of the claims.

In the accompanying drawing forming a part of this invention:

Figure 1:
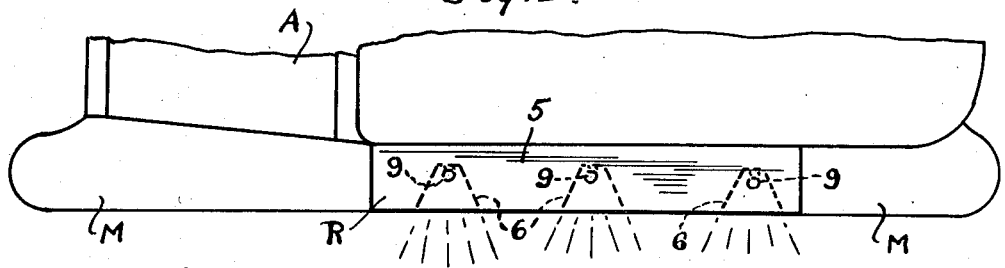
Fig. 1 is a plan view of a portion of an automobile showing the left running board thereof as constructed in accordance with this invention.
Figure 2:
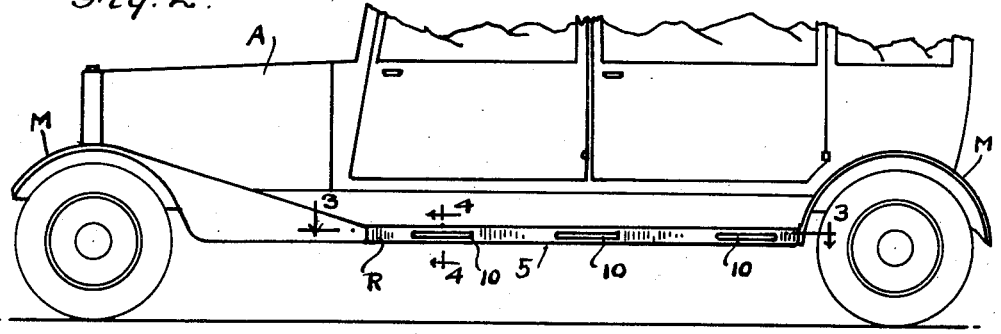
Fig. 2 is a side view thereof.
Figure 3:
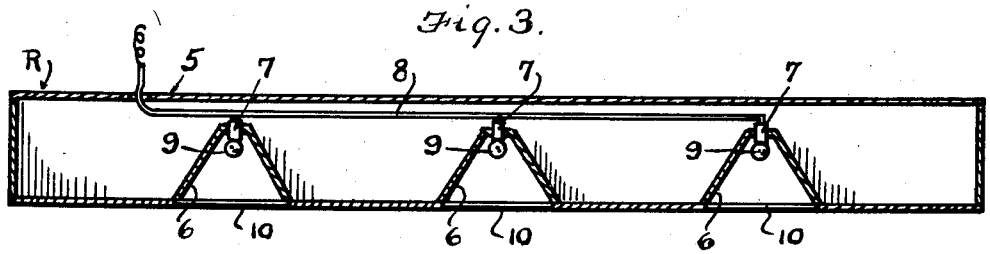
Fig. 3 is an enlarged longitudinal horizontal sectional view of the running board taken on line 3—3 of Fig. 2.
Figure 4:
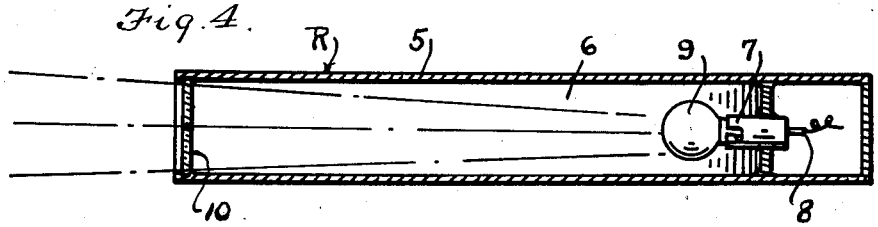
Fig. 4 is an enlarged cross sectional view of the running board taken on line 4—4 of Fig. 2.

In the present illustration of this invention the letter A designates, in general, a conventional automobile which among other auxiliaries consists of mudguards M and running boards of which the left running board only is herein shown by the letter R, the same constituting the subject matter of this invention. However, it is within the purview of this invention to utilize this type of running board on either or both sides of the automobile.

The present running board R preferably consists of a substantially rectangular hollow body 5 having a plurality of spaced light reflectors 6 disposed therein which are provided with suitable bulb sockets 7 adapted to removably accommodate electric bulbs 9 of approved candle power.

Provided in the outer edge or face of the running board and covering the light exit of each reflector is a lens 10 which is removably retained in position through the instrumentality of any approved securing element.

The light bulbs 9 are electrically connected to the usual source of electricity of the automobile by a conductor 8 which is connected to the usual light controlling switch (not shown) or which may be otherwise connected to the electrical system of the automobile.

Figure 5:
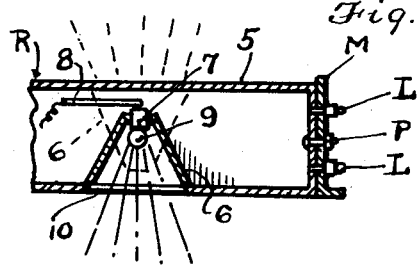
Fig. 5 is an enlarged longitudinal horizontal sectional view of a portion of a modified form of running board.

In that form of the running board shown in Fig. 5 provision is made whereby the same is pivoted to opposed mudguards M on either side of the automobile as by trunnions P and retained in normal position by suitable latches L and, through the instrumentality of this construction, the running board will not only function in illuminating the side of the road during night driving but the same can be readily reversed to cast beams of light under the automobile should the operator desire to grease or repair the mechanism thereunder.

Although the running board herein disclosed is provided with a plurality of reflectors it is to be understood that the number thereof may be reduced to a single compartment occupying the full length of the running board and provided with a single elongated lens or a plurality of lenses similar to those illustrated in the present instance.

With this invention fully set forth it is manifest that means have been provided whereby the roadside adjacent an automobile will be lighted while traveling at night and, through the introduction of this invention, safety is assured as well as convenience provided for greasing and repairing the automobile.

Having thus described my invention what I claim and desire to protect by Letters Patent is:

1. The combination with the body of an automobile, of a hollow running board, light reflectors disposed in the running board and communicating with the exterior at one edge of the running board, electric bulbs carried within the reflectors, and an electricity conduit connected to the bulbs.

2. The combination with the body of an automobile, of a hollow running board pivoted between opposed mudguards on the body, light reflectors disposed in the running board and communicating with the exterior at one edge of the running board, electric bulbs carried within the reflectors, an electricity conduit connected to the bulbs, and means for locking the running board in normal position.

3. The combination with the body of an automobile, of front and rear mudguards having opposed running board engaging areas, a hollow running board of a thickness equal to the opposed running board engaging areas of the mudguards disposed between the mudguards, light reflectors disposed in the running board and communicating with the exterior thereof, said reflectors being of a height equal to the distance between the top and bottom walls of the running board, electric bulbs carried within the reflectors, and an electricity conduit connected to the bulbs.

LAWRENCE D. BRIDGE.